Patented Jan. 8, 1952

2,582,206

UNITED STATES PATENT OFFICE 2,582,206

METHOD OF MAKING SODIUM SILICATE COMPOSITIONS

George R. McDaniel, Cincinnati, Ohio, assignor to Diamond Alkali Company, Cleveland, Ohio, a corporation of Delaware No Drawing. Application September 28, 1948, Serial No. 51,659

3 Claims. (Cl. 23—110)

This invention relates to improvements in methods of manufacture of water soluble sodium silicates in which the molecular ratio of sodium oxide to silica is equal to unity or greater and to new crystalline compositions of matter produced by such improved methods. More particularly, the invention is directed to improved methods of manufacture of alkaline sodium silicate materials, wherein the ratio of $Na_2O$ to $SiO_2$ is between unity and 1.6 to 1, and to silicate compositions having such ratios and having a reduced water of crystallization content.

Sodium metasilicate and sodium silicates having higher $Na_2O$ to $SiO_2$ ratios are well known to have utility in various washing and cleansing arts, either alone, or combined with other substances having properties complementary to the cleansing characteristics of the silicate materials. The materials having $Na_2O$ to $SiO_2$ ratios above 1:1 and especially between 1:1 and 1.6:1, are particularly useful for their higher alkali content.

The high alkali ratio sodium silicate compounds have heretofore been manufactured in various manners, the commonest and most used of which includes starting with liquid sodium metasilicate pentahydrate, which may suitably be produced by causticizing ordinary liquid silicate of soda until the desired alkali-silica ratio is achieved and adjusting the water content, treating this liquid with caustic soda (76% $Na_2O$) at a temperature of the order of 65° to 75° C., to produce the desired ratio of alkali to silica, and crystallizing by stirring, cooling, and seeding. Subsequent to a temperature rise indicative of incipient crystallization, the mix is cast in pans or molds where it hardens and may subsequently be ground to desired size and is then ready for use.

Sodium silicates prepared in this manner, ranging from the metasilicate $Na_2O \cdot SiO_2 \cdot 5H_2O$ to the compound $1.6Na_2O \cdot SiO_2 \cdot 5.6H_2O$, the latter being prepared from the liquid metasilicate pentahydrate as described above, and including the sesquisilicate $1.5Na_2O \cdot SiO_2 \cdot 5.5H_2O$, are well known compositions in the arts and have long been widely used.

As prepared in the above-described manner, however, these compounds are subject to serious disabilities which have heretofore not only limited their commercial attractiveness but in some cases have definitely limited their use. One of the most serious of these disabilities is poor shelf life in that in periods as short as a few weeks, materials which, as originally crystallized, are pure white, assume a yellowish tinge, and in a period of three to six months are definitely yellow in color, thus detracting from their appearance and particularly where combined with other detergent materials into compounded washing or cleansing compounds, from the usefulness of the composition where an absolutely white material is required.

A difficulty even more serious than that mentioned above, however, is that materials produced by these prior art processes, upon storage for a few weeks and especially for periods up to six months, yield when dissolved in distilled or softened water, solutions of progressively increasing turbidity. Turbid solutions being well recognized as a distinct disadvantage in washing and cleansing operations, especially where the deposition of sediment on the objects washed is involved, it is apparent that production of such turbid solutions is a distinct disadvantage of these materials detracting seriously not only from their saleability but also from their actual usefulness. Furthermore, in many washing operations employing alkaline cleaning compounds, mechanical washing devices are commonly used and the deposition of sediment from the washing solution often seriously hampers the proper functioning and operation of such apparatus.

Finally, materials prepared in accordance with described prior art methods show, upon storage, a distinct tendency to cake and fail to be free running, this property also being one which detracts from the usefulness of the materials.

The disadvantageous properties described above are especially notable in compositions wherein the ratio of $Na_2O$ to $SiO_2$ ranges between unity and 1.6 to 1, when prepared in accordance with the above-described prior art methods.

The present invention has as its principal object the provision of alkaline silicates having $Na_2O$ to $SiO_2$ ratios from unity to 1.6:1, which products have improved properties over compositions of similar character and function produced by prior art methods and to methods of producing the same.

A further object is the provision of methods of manufacture of such silicates and materials so produced having extended shelf life particularly as to color, clarity of ultimate solution, and free-flowing characteristics.

A further object is the provision of methods of manufacture of alkaline silicate hydrates and the hydrates themselves, wherein the ratio of $Na_2O$ to $SiO_2$ is between unity and 1.6 to 1, which remains absolutely white after months of storage, produce solutions of negligible turbidity after the same storage times, and remain free-flowing indefinitely.

Pursuant to the objects as aforesaid, the invention in general contemplates a method which includes the steps of removing water by atmospheric evaporation from liquid sodium metasilicate five hydrate liquor ($Na_2SiO_3 \cdot 5H_2O$) until the same contains between 4 and 4.5 molecules of water, treating this partially dehydrated material with the requisite amount of sodium hydroxide, while the hydrate is still warm and before crystallization has had a chance to occur, to obtain the desired $Na_2O$ to $SiO_2$ ratio, cooling and stirring to encourage crystallization, employing seeding preferably with similar crystals, if desired, and casting and grinding to obtain the final products, which final product contains on the average about ½ to 1 molecule of water less per mol of sodium silicate than was contained by the products of the prior art methods as described above. While the reasons therefore are not at present fully understood, this reduction in water content of the metasilicate liquor in the course of manufacture of the sodium silicate product has a marked effect upon the properties of the ultimate composition in that the disabilities and disadvantages of the compositions produced by the prior art methods are substantially entirely eliminated.

It should be observed that some of the above-mentioned benefits may accrue to a lesser degree to the alkaline sodium silicate compounds of $Na_2O$ to $SiO_2$ ratio between unity and 1.6 to 1 if the water content of the starting or base sodium metasilicate liquor is reduced to only between 4.5 and 5.0 molecules $H_2O$, although in general, in order to obtain the full benefits previously described, it is desirable to reduce the water content of the base metasilicate liquor to a value of $4.5H_2O$ or less. Also, the amount of water that should be present in the starting base metasilicate liquor for production of compositions possessing desirable properties is related somewhat to the ratio of the alkaline sodium silicate it is desired to produce. Those compostions having ratios on the lower side of the stipulated ratio range, such as $1.2Na_2O$ to $1SiO_2$ and $1.3Na_2O$ to $1 SiO_2$, require in general a relative low water content of the base metasilicate liquor, such as a value of 4 mols of $H_2O$ or value close thereto, while compositions having ratios on the higher side of the ratio range, such as $1.4Na_2O$ to $1SiO_2$ and $1.5Na_2O$ to $1SiO_2$, require in general that the water content of the base metasilicate be only of the order of 4.5 mols $H_2O$ for the resultant alkaline sodium silicate compounds to possess stability against discoloration and resistance to formation of turbid solutions upon solution in distilled water.

Thus, compositions prepared in accordance with the present invention are entirely white as originally synthesized and after extended periods of standing, remain entirely white and fail to assume the yellowish tinge of the compositions prepared by the methods of the prior art. Moreover, the compositions prepared by the method of this invention produce entirely clear solutions in distilled water after storage periods of as long as six months, which solutions have practically imperceptible turbidity and certainly no more turbidity than solutions of the same materials which have not been subjected to storage at all. Finally, the materials of the present invention retain their free-flowing characteristics for an indefinite period of time, thus adding to the attractiveness of the product for detergent uses and for ultimate combination with other detergent materials in accordance with procedures well understood in the art.

Within the stipulated ratio range of $1.6Na_2O$ to $1SiO_2$ and $1Na_2O$ to $1SiO_2$ of the sodium silicate compositions described in this disclosure, those preparations close to the $1.6Na_2O$ to $1 SiO_2$ ratio are relatively less benefited with respect to the several desirable properties already discussed than the lower ratios, such as $1.5Na_2O$ to $SiO_2$ and below. In this connection, it has been observed that compositions proximate to the $1.6Na_2O$ to $1SiO_2$ range prepared from a base metasilicate liquor containing the usual $5H_2O$ mols of water, or $Na_2SiO_3 \cdot 5H_2O$, do not in general exhibit as much turbidity upon solution in distilled water or discolor as quickly upon aging as do compositions of lower ratio, such as $1.5 Na_2O$ to $1SiO_2$ and lower, prepared using liquid sodium metasilicate-pentahydrate as the base starting liquor. Otherwise expressed, a low water content of compositions of ratio close to $1.6Na_2O$ to $1SiO_2$ is not as essential for desirable characteristics as is a low water content in the compositions of lower ratio, such as $1.5Na_2O$ to $1SiO_2$ and below. This fact will be more readily apparent by an observation of the data appearing in the table below. Nevertheless, there is notable improvement in compositions of $1.6Na_2O$ to $1SiO_2$ ratio of lower water content which would not be the case if regular liquid sodium metasilicate-pentahydrate were used as the base liquor.

The sodium silicate compositions in the ratio range from slightly above unity up to and including $1.2Na_2O$ to $1SiO_2$, prepared from a base metasilicate liquor having a water content of 4 to 4.5 mols $H_2O$, are more or less reluctant to start crystallization as evidenced by a temperature rise of the solution, thus requiring a more or less prolonged period of agitation to start crystallization, but a relatively long period of stirring to start crystallization is also required for these ratio compositions even if they are prepared using regular liquid five hydrate sodium metasilicate as the base liquor. However, since these low ratio compositions are relatively close to the meta ratio, there are few commercial instances where they would be required in place of the straight sodium metasilicate products. The higher ratio compositions disclosed in the present invention, from about $1.3Na_2O$ to $1SiO_2$, prepared from a base sodium metasilicate liquor as low as the four hydrate in water content, have been found to require only a moderate amount of time for crystallization, such for instance, as is usual for crystallizing sodium metasilicate-pentahydrate liquor, or sodium sesquisilicate liquor of composition represented by the formula, $1.5Na_2O \cdot 1SiO_2 \cdot 5.5H_2O$.

Accordingly, in accordance with the present invention, materials having a ratio of $Na_2O$ to $SiO_2$ of between unity and 1.6 to 1 may suitably be prepared by the method of the present invention and when so prepared, possess the above-noted properties of advantage over the materials of the prior art which differ from the materials of the method of the present invention only in the amount of water of hydration associated therewith.

It is appreciated that heretofore in the art of preparing sodium silicate compositions of the sesqui, or $1.5Na_2O$ to $1SiO_2$ ratio, an example is given of crude crystals being deposited from an aqueous sodium silicate solution containing an amount of excess of caustic soda, and that such crude crystals have been designated as being a technical sodium pyrosilicate of a composition represented by the formula, $Na_6Si_2O_7 \cdot 10H_2O$, which it will be observed falls within the composition range of the products of the present invention. However, other investigations in this field have shown that sesqui ratio crystals separated from sodium silicate solutions of specified composition are of the formula, $$3Na_2O \cdot 2SiO_2 \cdot 11H_2O$$

These sesqui crystals of the formula, $$3Na_2O \cdot 2SiO_2 \cdot 11H_2O$$

have been definitely identified as to crystal habit and form and so far as is known, no other hydrate of sodium sesquisilicate has been isolated and definitely described as to crystal habit and form. It will be appreciated that the $$3Na_2O \cdot 2SiO_2 \cdot 11H_2O$$

formula is the composition of the prior art products containing the larger amounts of water.

Also in my Patent No. 2,153,872, dated April 11, 1939, there is mentioned an intermediate composition in the preparation of sodium orthosilicate, which intermediate composition is represented by the formula, $1.5Na_2O \cdot 1SiO_2 \cdot 4.5H_2O$. This intermediate sodium silicate composition, which is prepared under vacuum evaporation, remains entirely in the liquid state and caustic soda is added thereto to form an orthosilicate that is subsequently solidified. It was not appreciated at that time that had the liquid $$1.5Na_2O \cdot 1SiO_2 \cdot 4.5H_2O$$

been crystallized, it would have made a product of the superior advantages set forth in the present invention.

Accordingly, the present invention proposes for the first time to my knowledge a material and a method for making the same, which material will have a relatively high alkali to silicate ratio and which will, after extended periods of storage, remain completely white and will form with distilled or softened water absolutely clear solutions, while still remaining free-flowing after these periods of storage. The method has the advantage of being entirely of a commercial character since the only additional step added over the well understood commercial methods is that of evaporation of the metasilicate liquor to a higher gravity.

In order that those skilled in the art may more particularly understand the proposals of the present invention, the following examples are set forth as illustrative of the invention, it being understood that the same are to be taken as exemplary only and not as limiting, except as set forth in the appended claims.

EXAMPLE I

*Method of producing $1.3Na_2O \cdot 1SiO_2 \cdot 4.3H_2O$ using $Na_2SiO_3 \cdot 4H_2O$ as the base liquor*

To 200 parts by weight of liquid silicate of soda containing 8.9% $Na_2O$ and 28.7% $SiO_2$, there are added 109 parts by weight of liquid caustic soda of 38% $Na_2O$ content. The resulting solution thus has 309 parts by weight and has a ratio of $Na_2O$ to $SiO_2$ of 1:1, i. e. the meta ratio. From this solution there is removed by evaporation 123.5 parts by weight of water, leaving 185.5 parts by weight of concentrated solution of a composition represented by the formula, $$Na_2SiO_3 \cdot 4H_2O$$

The 185.5 parts by weight of $Na_2SiO_3 \cdot 4H_2O$ are adjusted to a temperature between 65° and 75° C., and then while stirring, there is added 23.5 parts by weight of flake 76% caustic soda. After the dissolution of the caustic, which causes some temperature rise, the resulting mixture is allowed slowly to cool while being stirred. A quantity of finely divided $1.3Na_2O \cdot 1SiO_2 \cdot 4.3H_2O$ may be added as seed material, while continuing to stir the mixture. Stirring is continued until a temperature rise of 1° to 2° C. occurs, after which the mix is cast into pans or molds. The composition hardens upon cooling and after several hours to one day's aging, forms a very hard cake which may be ground to a dry, free-flowing, stable material.

EXAMPLE II

*Method of producing $1.5Na_2O \cdot 1SiO_2 \cdot 4.8H_2O$ from $Na_2SiO_3 \cdot 4.25H_2O$ liquor*

Ordinary sodium metasilicate pentahydrate liquor, prepared according to the procedure of Example I, is concentrated by boiling to the 4¼ hydrate, which has a gravity of approximately 66° Baumé at 100° C. Starting with 200 parts by weight of the $Na_2SiO_3 \cdot 5H_2O$ liquor, 12.8 parts by weight of water are removed by evaporation. To the resulting 187.2 parts by weight of sodium metasilicate liquor represented by the formula, $Na_2SiO_3 \cdot 4.25H_2O$, at a temperature of approximately 65° to 75° C., there are added 38.5 parts by weight of 76% flake caustic soda while the solution is stirred. After solution of the caustic, which is accompanied by some temperature rise, stirring is continued and a quantity of seed material of the composition $1.5Na_2O \cdot 1SiO_2 \cdot 4.8H_2O$ is added. Stirring is carried out until there is a temperature rise of the order of ½° to 1° C., whereupon the mixture is cast into pans or molds to harden and crystallize. This requires a period of several hours to one day, after which the hardened material may be broken, ground and processed.

EXAMPLE III

*Method of making $1.5Na_2O \cdot 1SiO_2 \cdot 5H_2O$ from $Na_2SiO_3 \cdot 4.5H_2O$ liquor*

According to this example, which represents a preferred method of carrying out the invention, 200 parts by weight of sodium metasilicate-pentahydrate liquor are concentrated by evaporation of 8.5 parts by weight of water to a composition represented by the formula, $Na_2SiO_3 \cdot 4½H_2O$, which has a gravity of approximately 65° Bé. at 100° C. To the 191.5 parts by weight of the 4½ hydrate liquor at a temperature of 65° to 75° C., there are added, while stirring, 38.5 parts by weight of 76% flake caustic soda. After solution of the caustic, which causes some temperature rise, while still stirring, a quantity of seed material ($1.5Na_2O \cdot 1SiO_5 \cdot H_2O$) is added. Stirring is continued until a small temperature rise, such as ½° C., is noted in the composition, at which point it is cast. After a period of aging from a few hours up to one day, the cast composition is very hard and may be reduced to any desired degree of fineness. Such ground material preserved in airtight containers remains dry, free-flowing, and stable against discoloration and turbidity for periods up to six months or longer.

EXAMPLE IV

*Method of preparation of $1.6Na_2O \cdot 1SiO_2 \cdot 5.1H_2O$ from $Na_2SiO_3 \cdot 4\frac{1}{2}H_2O$ liquor*

200 parts by weight of sodium metasilicate-pentahydrate liquor are evaporated to a weight of 191.5 parts by the removal of 8.5 parts by weight of water. To the 191.5 parts by weight of the 4½ hydrate liquor at a temperature of 65° to 75° C., there are added, while stirring, 46.2 parts by weight of 76% flake caustic soda. Crystallizing, seeding, casting, etc., are carried out in the same manner as described in Example III.

Further illustrative of the outstanding advantages of the present invention is the table set forth below, in which a comparison is made between the compositions obtained when the hydrate of the base meta liquor, from which the method is started, has associated therewith the normal amount of water of hydration as opposed to compositions of the present invention, wherein the base meta liquor has been dehydrated to a certain extent in accordance with these teachings, to obtain the compositions produced by the method of this invention. Thus, it will be appreciated that the methods of the present invention contemplate reducing the water of hydration of the base meta silicate liquor by atmospheric evaporation to a value between 4 and less than 5 mols of water, which produces in the causticized finished products water to the extent of between 4.0 and less than 5.6 mols water per mol of finished product.

TABLE OF SODIUM SILICATE COMPOSITIONS ILLUSTRATING EFFECT OF WATER CONTENT ON TURBIDITY AND COLOR WITH AGE
[Turbidities measured in parts per million in 10% solution.]

| Finished Formula | Hydrate of Base Meta Liquor | Turbidity, P. P. M. | | | Color | | |
|---|---|---|---|---|---|---|---|
| | | 1 Day | 3 Mo. | 6 Mo. | 1 Day | 3 Mo. | 6 Mo. |
| $1.01Na_2O \cdot 1SiO_2\ 4.5H_2O$ | $4.5\ H_2O$ | 10 | 10 | 15 | White | White | White. |
| $1.01Na_2O \cdot 1SiO_2\ 5.0H_2O$ | $5.0\ H_2O$ | 20 | 150 | 150+ | ---do---- | Yellow | Yellow. |
| $1.3Na_2O \cdot 1SiO_2\ 4.3H_2O$ | $4.0\ H_2O$ | 10 | 10 | 10 | ---do---- | White | White. |
| $1.3Na_2O \cdot 1SiO_2\ 4.8H_2O$ | $4.5\ H_2O$ | 10 | 10 | 10 | ---do---- | ---do---- | Do. |
| $1.3Na_2O \cdot 1SiO_2\ 5.3H_2O$ | $5.0\ H_2O$ | 10 | 200 | 200+ | ---do---- | Cream | Cream. |
| $1.5Na_2O \cdot 1SiO_2\ 4.5H_2O$ | $4.0\ H_2O$ | 10 | 10 | 15 | ---do---- | White | White. |
| $1.5Na_2O \cdot 1SiO_2\ 5.0H_2O$ | $4.5\ H_2O$ | 10 | 15 | 20 | ---do---- | ---do---- | Do. |
| $1.5Na_2O \cdot 1SiO_2\ 5.0H_2O$ | $5.0\ H_2O$ | 15 | 300 | 300+ | ---do---- | Yellow | Yellow. |
| $1.6Na_2O \cdot 1SiO_2\ 4.6H_2O$ | $4.0\ H_2O$ | 10 | 20 | 25 | ---do---- | White | White. |
| $1.6Na_2O \cdot 1SiO_2\ 5.1H_2O$ | $4.5\ H_2O$ | 15 | 20 | 25 | ---do---- | ---do---- | Do. |
| $1.6Na_2O \cdot 1SiO_2\ 5.6H_2O$ | $5.0\ H_2O$ | 20 | 25 | 30 | ---do---- | ---do---- | Do. |

As noted above and in the examples, the method is applicable to sodium silicates, wherein the ratio of $Na_2O$ to $SiO_2$ ranges between unity and 1.6 to 1. A particularly preferred member of this class is the so-called sesquisilicate, wherein the $Na_2O$ to $SiO_2$ ratio is 1.5 to 1 or 3 to 2, and it is a particular feature of this invention to produce such a composition which shall have the advantages set forth above and which, in accordance with the teachings of this invention, shall have associated in the final composition, together with $Na_2O$ and $SiO_2$ in a ratio of 1.5 to 1, but five molecules of associated water of hydration. This sesquisilicate product, as prepared in accordance with the teachings of this invention, has all of the advantages set forth above, as may more particularly be seen from Example III, as well as from the table appended above and forming a part of this specification.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of manufacturing sodium silicate compounds which includes the steps of evaporating sodium metasilicate pentahydrate to a water content of between 4 and 4.5 molecules of water per molecule of metasilicate, causticizing said evaporated material to a ratio of $Na_2O$ to $SiO_2$ of between unity and 1.5 to 1, and crystallizing the causticized product.

2. The method of manufacturing sodium silicate which includes the steps of causticizing liquid silicate of soda to a $Na_2O$ to $SiO_2$ ratio of 1 to 1, adjusting to a water content of five mols of water per mol of metasilicate, evaporating said composition to a water content of between 4 and 4.5 mols of water per mol of metasilicate, causticizing said evaporated metasilicate to $Na_2O$ to $SiO_2$ ratio of not greater than 1.5 to 1, and recovering a crystalline product.

3. In the method of manufacture of hydrous sodium silicate, having a ratio of sodium oxide to silica between unity and 1.5 to 1 and a water of hydration between 4 and 5 mols of $H_2O$ per mol of anhydrous sodium silicate, the steps which include preparing an aqueous solution of meta ratio by addition and solution of caustic soda in correct proportion to liquid silicate of soda, evaporating at atmospheric pressure said meta ratio solution to a water content between 4 and 4.5 mols $H_2O$ per mol of anhydrous sodium metasilicate, cooling the resultant metasilicate liquor, adding caustic soda to the metasilicate liquor in amounts to produce a final ratio of sodium oxide to silica between unity and 1.5 to 1, and crystallizing resultant sodium silicate solution.

GEORGE R. McDANIEL.

REFERENCES CITED

The following references are of record in the file of this patent:

UNITED STATES PATENTS

| Number | Name | Date |
|---|---|---|
| 1,813,701 | Howe | July 7, 1931 |
| 1,948,730 | Morey | Feb. 27, 1934 |
| 1,953,840 | Waddell | Apr. 3, 1934 |
| 2,083,545 | Burkhardt et al. | June 15, 1937 |
| 2,100,944 | Davies | Nov. 30, 1937 |
| 2,153,872 | McDaniel | Apr. 11, 1939 |
| 2,175,781 | Riggs | Oct. 10, 1939 |
| 2,206,289 | McDaniel | July 2, 1940 |